United States Patent
Nakashima et al.

(10) Patent No.: US 11,537,438 B2
(45) Date of Patent: Dec. 27, 2022

(54) INFORMATION PROCESSING APPARATUS, INFORMATION PROCESSING METHOD, AND STORAGE MEDIUM FOR EFFICIENT STORAGE OF KERNELS OF VARIOUS SIZES

(71) Applicant: CANON KABUSHIKI KAISHA, Tokyo (JP)

(72) Inventors: Daisuke Nakashima, Kawasaki (JP); Tsewei Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 16/900,613

(22) Filed: Jun. 12, 2020

(65) Prior Publication Data

US 2020/0409760 A1 Dec. 31, 2020

(30) Foreign Application Priority Data

Jun. 28, 2019 (JP) .............. JP2019-122086

(51) Int. Cl.
  *G06F 9/50* (2006.01)
  *G06N 3/10* (2006.01)
  *G06N 3/063* (2006.01)
  *G06V 30/194* (2022.01)

(52) U.S. Cl.
  CPC .......... *G06F 9/5016* (2013.01); *G06N 3/063* (2013.01); *G06N 3/10* (2013.01); *G06V 30/194* (2022.01)

(58) Field of Classification Search
  None
  See application file for complete search history.

(56) References Cited

U.S. PATENT DOCUMENTS

2018/0157962 A1* 6/2018 Henry .................. G06N 3/0445
2019/0057061 A1* 2/2019 Targowski ............... G06N 5/02
2020/0050555 A1* 2/2020 Kim ...................... G06F 12/126

FOREIGN PATENT DOCUMENTS

JP     H03105452 A     5/1991

OTHER PUBLICATIONS

Chen et al., Optimizing Memory Efficiency for Convolution Kernels on Kepler GPUs, arXiv:1705.10591v1 [cs.DC] May 29, 2017, Total pp. 6 (Year: 2017).*
Yann Lecun, Convolutional Networks and Applications in Vision, Proceedings of 2010 IEEE International Symposium on Circuits and Systems, Paris, 2010, pp. 253-256, doi: 10.1109/ISCAS.2010.5537907.
Kaiming He, Deep Residual Learning for Image Recognition, 2016 IEEE Conference on Computer Vision and Pattern Recognition (CVPR), Las Vegas, NV, 2016, pp. 770-778, doi: 10.1109/CVPR.2016.90.

* cited by examiner

*Primary Examiner* — Alan Chen
(74) *Attorney, Agent, or Firm* — Canon U.S.A., Inc. IP Division

(57) ABSTRACT

An information processing apparatus includes a determination unit configured to determine a storage method of storing a kernel based on a configuration of a plurality of memory areas and a size of the kernel, a storage unit configured to store the kernel using the determined storage method, a reading unit configured to read the kernel from the storage unit based on the storage method of storing the kernel, and a calculation unit configured to execute calculation using input data and the read kernel.

13 Claims, 16 Drawing Sheets

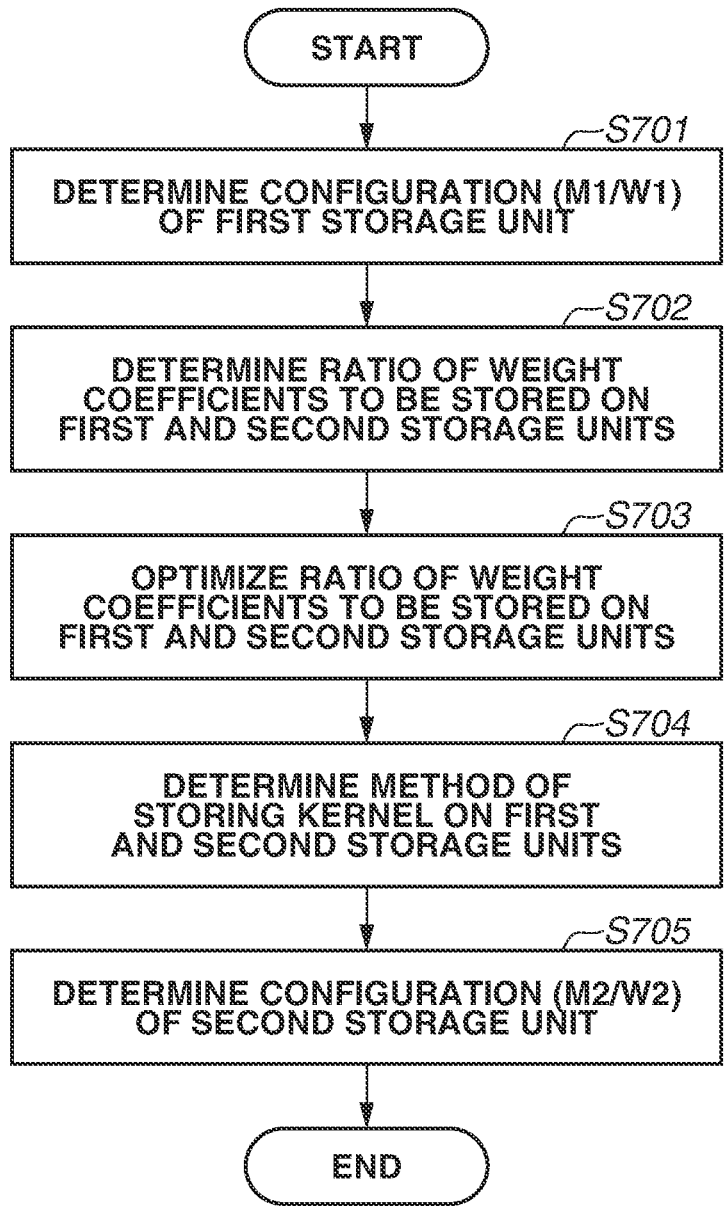

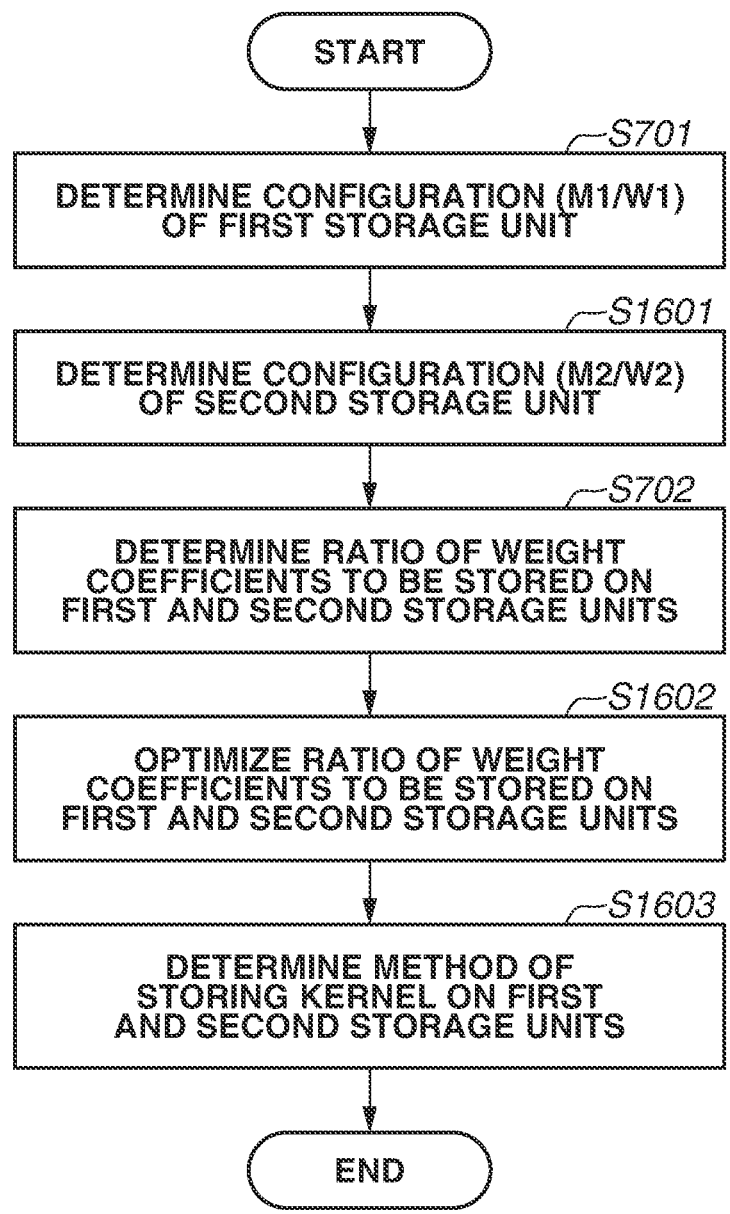

INFORMATION PROCESSING APPARATUS, INFORMATION PROCESSING METHOD, AND STORAGE MEDIUM FOR EFFICIENT STORAGE OF KERNELS OF VARIOUS SIZES

BACKGROUND OF THE INVENTION

Field of the Invention

The present invention relates to techniques for processing information in, for example, storing a kernel for use in neural network convolution calculation on a memory.

Description of the Related Art

Neural networks are widely used in the fields of pattern recognition processing for recognizing a specific pattern in target data in image recognition or audio recognition. Methods for implementing neural networks to embedded devices using hardware to realize high performance and low cost have been discussed. Further, Japanese Patent Application Laid-Open No. 3-105452 discusses a circuit configuration for reducing the memory size configured to store weight coefficients of network connections. A target neural network discussed herein is a fully-connected neural network that uses different weight coefficients for all pixels. Especially convolutional neural networks (CNNs) among the neural networks have drawn attention as a method that can realize robust pattern recognition with respect to changes in recognition targets. For example, Yann LeCun, Koray Kavukvuoglu, and Clement Farabet, "Convolutional Networks and Applications in Vision", ISCAS2010, discusses various examples of applications and implementations using CNNs.

In CNN calculation processing, various types of calculation, such as convolution calculation and non-linear processing, are performed. In convolution calculation in CNN calculation, kernels of various sizes are used. For example, Kaiming He, Xiangyu Zhang, Shaoqing Ren, and Jian Sun, "Deep Residual Learning for Image Recognition", CVPR2016, discusses CNNs using kernels with sizes of 1×1, 3×3, and 7×7. Hardware that executes CNN calculation stores CNN kernels on a memory as needed. At this time, the kernels are successively stored from a starting address of the memory. The kernels are also given sequential indexes starting with 0 in order of storage on the memory. Since various sizes of kernels are used in convolution calculation, for example, kernels having a size that is not greater than the data width of the memory are arranged in the memory such that the kernels in an amount that fits in one address are collectively arranged. At this time, one kernel is arranged only in one address. On the other hand, kernels having a greater size than the data width of the memory are arranged such that only the kernels having one index are arranged in one address. Such a kernel storage method has an advantage in that the circuit configuration is simple and cost reduction is easy because of simple arrangement patterns of the method. Another kernel storage method is a method in which kernels of different indexes are successively arranged. This method has an advantage in that the use rate of the memory is high because the kernels are arranged without space.

Networks of CNNs have increased in size due to recent advancement in deep learning technology. When large-scale CNNs are implemented to hardware, kernels of various sizes still need to be efficiently stored on a memory. However, for example, the method discussed in Japanese Patent Application Laid-Open No. 3-105452 is based on a fully-connected neural network, and the kernel size is limited to 1×1, so that it is difficult to efficiently store various sizes of kernels on a memory. With the kernel storage method in which only kernels of one index are arranged in one address, the memory use rate decreases. In the kernel storage method in which kernels of different indexes are successively arranged, kernels of different indexes are successively arranged. Thus, a kernel reading method becomes complicated, and it takes time to read the kernels. In other words, even kernels in a same size are read by different reading methods depending on the indexes of the kernels, and thus a number of reading method patterns increases and the circuit configuration for reading the kernels becomes complicated. Accordingly, processing cost increases, and the processing time becomes long.

SUMMARY OF THE INVENTION

The present disclosure is directed to techniques that enable efficient storage of kernels of various sizes on a memory and also achieve simple and high-speed reading.

According to an aspect of the present invention, an information processing apparatus includes a determination unit configured to determine a storage method of storing a kernel based on a configuration of a plurality of memory areas and a size of the kernel, a storage unit configured to store the kernel using the determined storage method, a reading unit configured to read the kernel from the storage unit based on the storage method, and a calculation unit configured to execute calculation using input data and the kernel read by the reading unit.

Further features of the present invention will become apparent from the following description of exemplary embodiments with reference to the attached drawings.

BRIEF DESCRIPTION OF THE DRAWINGS

FIG. 7 is a flowchart illustrating a process of determining kernel storage methods and memory configurations.

FIG. 16 is a flowchart illustrating a process of determining a kernel storage method according to a third exemplary embodiment.

DESCRIPTION OF THE EMBODIMENTS

Various exemplary embodiments of the present invention will be described in detail below with reference to the attached drawings. Each configuration described in the exemplary embodiments is a mere example, and the present invention is not limited to the illustrated configurations.

Figure 1:
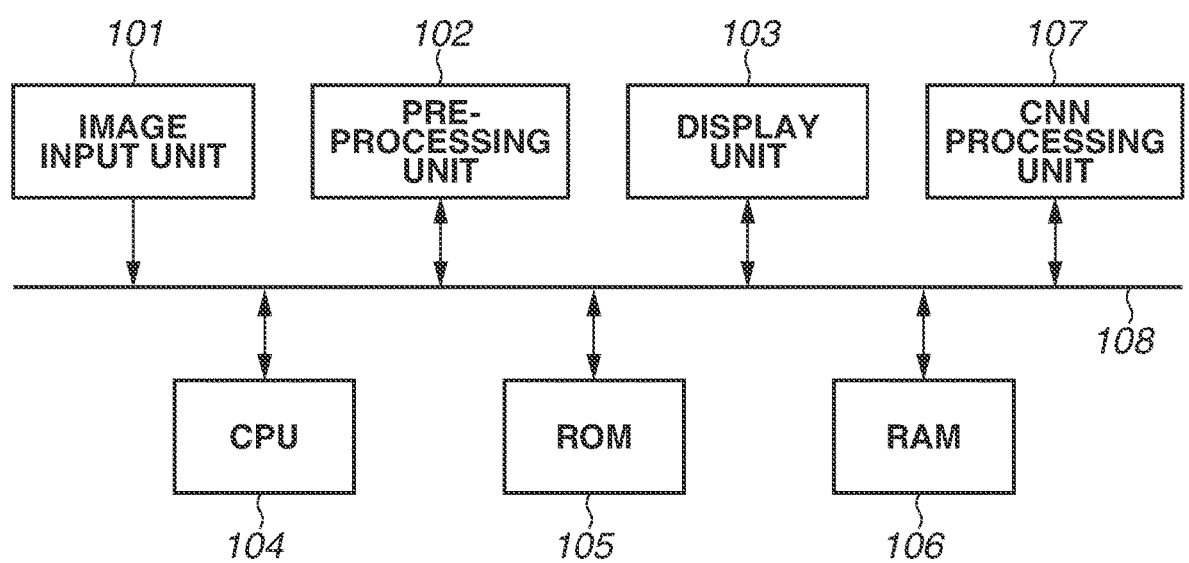
FIG. 1 illustrates an example of a configuration of an image processing apparatus.

FIG. 1 illustrates an example of a schematic configuration of an image processing apparatus that uses a pattern recognition apparatus, which is an example of an information processing apparatus according to a first exemplary embodiment.

An image input unit 101 is an apparatus configured to input an image of a pattern recognition target. The image input unit 101 includes an image capturing optical system, a photoelectric conversion device, and a driver circuit configured to drive the photoelectric conversion device, an analog-digital (AD) converter, a signal processing circuit configured to process various types of image correction, and a frame buffer. The photoelectric conversion device is a charge-coupled device (CCD) sensor or a complementary metal oxide semiconductor (CMOS) sensor.

A pre-processing unit 102 performs various types of pre-processing for effective execution of pattern recognition processing. Specifically, the pre-processing unit 102 performs image data conversion processing, such as color conversion processing and contrast correction processing, using hardware. Image data input from the image input unit 101 is processed by the pre-processing unit 102, and the processed image data is stored on a random access memory (RAM) 106.

A display unit 103 is an apparatus configured to display pattern recognition result image data. In general, a cathode ray tube or liquid crystal display is used as the display unit 103. Alternatively, the display unit 103 can be an external display apparatus that is connected via a cable. In a case where, for example, object (e.g., human head portion) detection is executed by pattern recognition processing, the display unit 103 displays an input image with a frame of the object detection result superimposed on the displayed input image.

A convolutional neural network (CNN) processing unit 107 is a processing unit configured to execute processing including the pattern recognition processing according to the present exemplary embodiment. The CNN processing unit 107 performs pattern recognition processing using especially CNN among neural networks. Details of a configuration and processing of the CNN processing unit 107 will be described below.

A central processing unit (CPU) 104 controls operations of the entire image processing apparatus. The CPU 104 also executes post-processing on CNN processing results.

A read-only memory (ROM) 105 is a storage medium that stores programs for processing and control that are executed by the CPU 104. The programs include a program for the CPU 104 to execute processing according to the present exemplary embodiment. The RAM 106 is a storage medium that provides a work area for the CPU 104 to execute various types of processing, and temporarily stores various types of data. The ROM 105 stores a program used by the CPU 104 for executing various types of processing. The program is first read and loaded to the RAM 106, and the read program is executed by the CPU 104. In addition to the required data for executing processing by the CPU 104, the RAM 106 stores pre-processed image data, a kernel used by the CNN processing unit 107 for CNN convolution calculation, and information about the CNN processing results.

A bus 108 connects the components of the image processing apparatus to one another.

Figure 2:
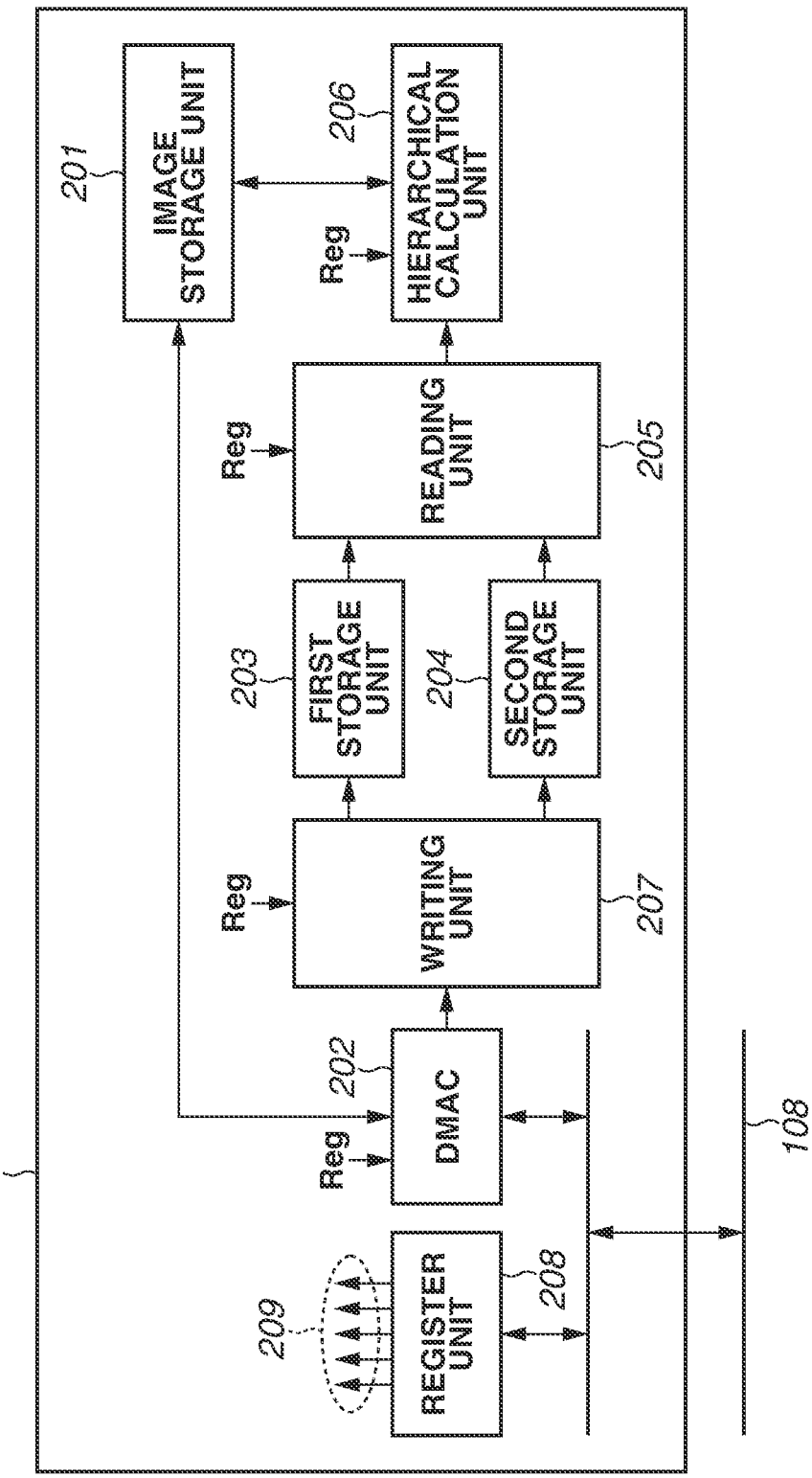
FIG. 2 illustrates an example of a configuration of a convolution neural network (CNN) processing unit.

FIG. 2 illustrates an example of a configuration of the CNN processing unit 107.

A direct memory access controller (DMAC) 202 reads the pre-processed image data and the kernel from the RAM 106, transmits the read image data to an image storage unit 201, and sends the read kernel to a writing unit 207. After the CNN processing is completed, the DMAC 202 stores the information about the CNN processing result, which is stored on the image storage unit 201, on the RAM 106. Further, in the present exemplary embodiment, there is a memory area, in the RAM 106, used by at least two storage units, e.g., a first storage unit 203 and a second storage unit 204.

The writing unit 207 stores the kernel received from the DMAC 202 on the first storage unit 203 and the second storage unit 204 as described below. Details of a method of storing the kernel and determining configurations of the first storage unit 203 and the second storage unit 204 will be described below.

A reading unit 205 reads the kernel stored on the first storage unit 203 and the second storage unit 204, and transmits the read kernels to a hierarchical calculation unit 206. A method of reading the kernels will be described below.

Figure 4:
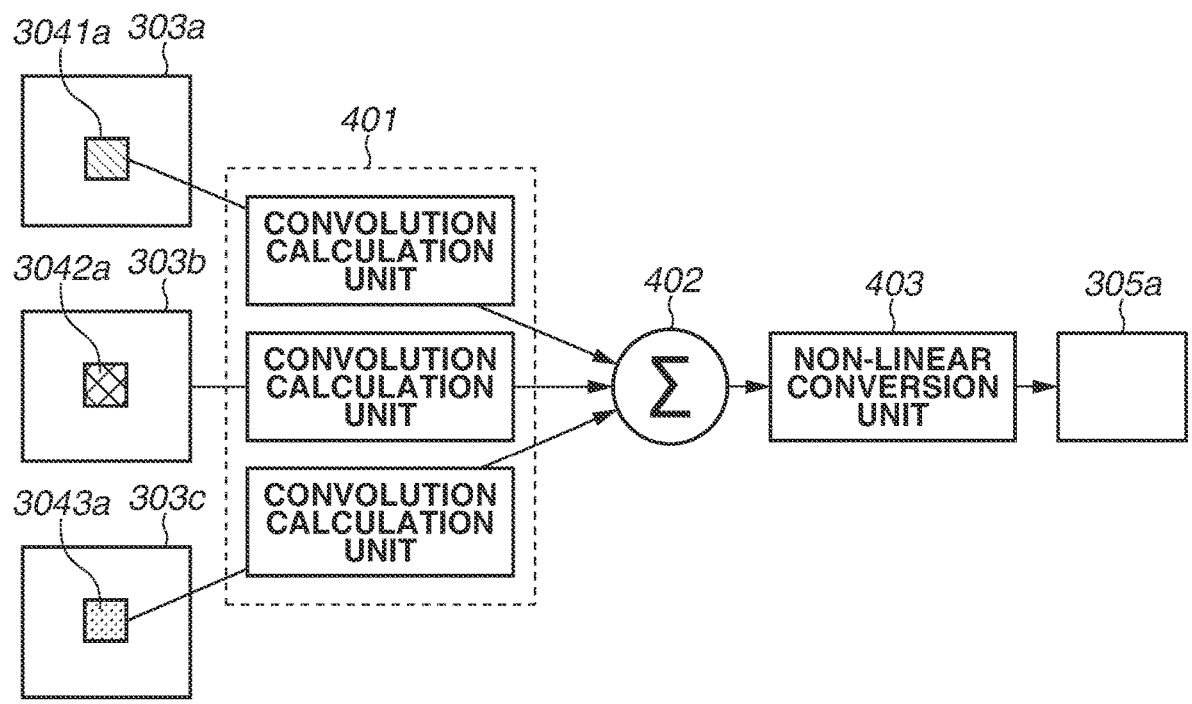
FIG. 4 illustrates an example of a configuration that performs CNN calculation.

The hierarchical calculation unit 206 has a hardware configuration as illustrated in FIG. 4 described below. The hierarchical calculation unit 206 executes convolution calculation in CNN hierarchical units using the image data read from the image storage unit 201 and the kernel received from the reading unit 205.

A register unit 208 holds setting values for the following units: DMAC 202, the writing unit 207, the reading unit 205, and the hierarchical calculation unit 206. Each setting value, as a control signal 209, is input to each unit. In the present exemplary embodiment, the setting values held by the register unit 208 are controlled by the CPU 104. The CPU 104 controls the components of the CNN processing unit 107 by changing the setting values held by the register unit 208.

Before describing details of the processing performed by the CNN processing unit 107 according to the present exemplary embodiment, a CNN calculation will be described with reference to FIGS. 3 and 4.

Figure 3:
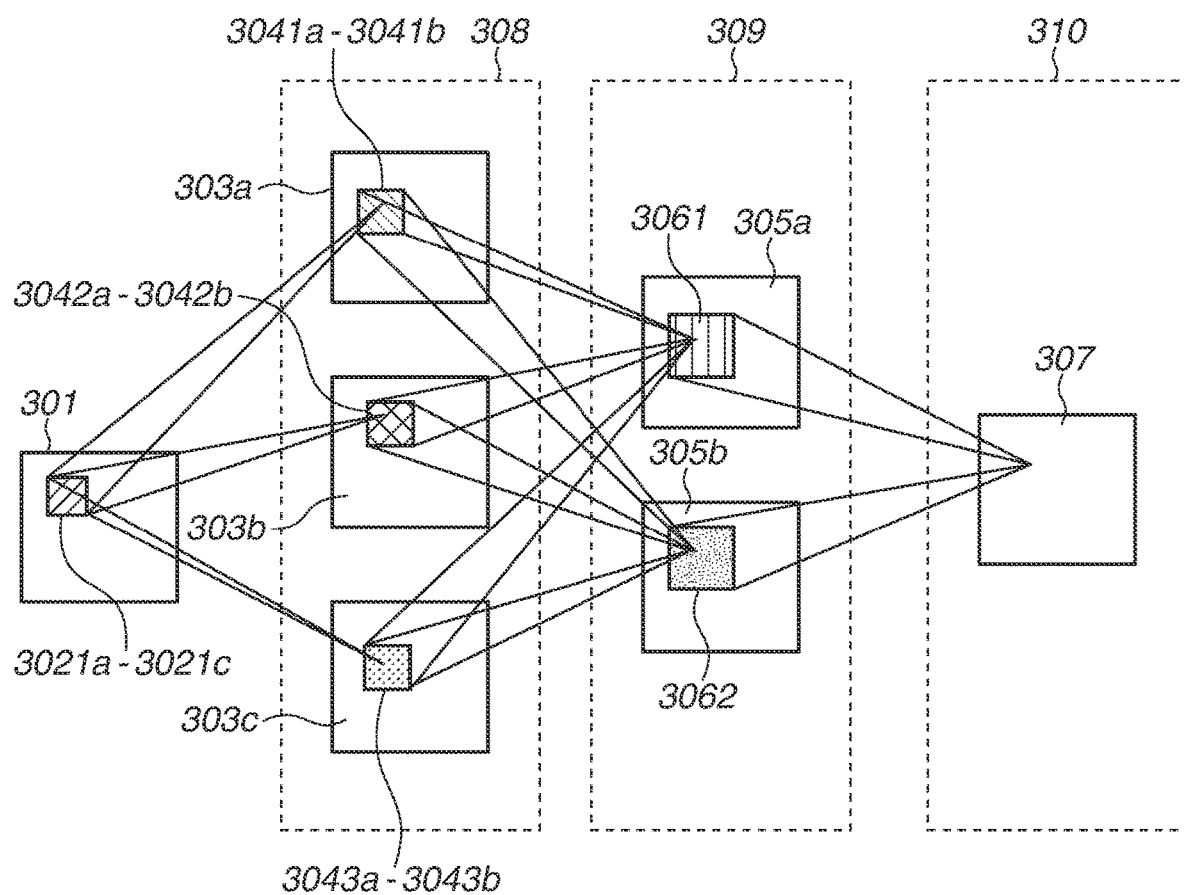
FIG. 3 illustrates a CNN calculation.

FIG. 3 schematically illustrates the CNN calculation. To simplify the description, a CNN with three hierarchical layers will be described as an example. Many CNNs in general consist of more feature planes and more hierarchical layers. An input layer 301 corresponds to raster-scanned, predetermined-sized image data when CNN calculation processing is performed on image data. Feature planes 303a to 303c are feature planes of a first hierarchical layer 308. The term "feature plane" refers to a data plane that corresponds to a processing result of predetermined feature extraction calculation (convolution calculation and non-linear processing). Since a feature plane is a processing result on raster-scanned image data, the processing result is also represented by a plane. The feature planes 303a to 303c are calculated by convolution calculation and non-linear processing on the input layer 301. For example, the feature plane 303a is calculated by convolution calculation using a schematically-illustrated two-dimensional kernel 3021a and non-linear conversion on the convolution calculation result. For example, the convolution calculation in a case where the kernel size is columnSize×rowSize is a product-sum calculation as expressed by the following formula (1):

$$\text{output}(x, y) = \sum_{row=-rowSize/2}^{rowSize/2} \sum_{column=-columnSize/2}^{columnSize/2} \text{input}(x+column, y+row) \times \text{weight}(column, row).$$ (1)

In formula (1), input(x, y) represents a reference pixel value at two-dimensional coordinates (x, y), and output(x, y) represents a calculation result at the two-dimensional coordinates (x, y). Weight(column, row) represents a weight coefficient at coordinates (x+column, y+row). ColumnSize represents a horizontal size of the two-dimensional kernel, and rowSize represents a vertical size of the two-dimensional kernel. In the present exemplary embodiment, 1×1 to 7×7 sizes are described below as an example of the kernel size columnSize×rowSize.

In CNN calculation, the product-sum calculation is repeated while a plurality of kernels is scanned in pixel units, and the non-linear conversion is performed on a final product-sum result for each hierarchical layer, whereby a feature plane is calculated. In a case where the feature planes 303a to 303c are calculated, the number of connections to a previous hierarchical layer is one, and thus the number of kernels is one.

FIG. 4 illustrates an example of a schematic configuration of hardware configured to execute CNN calculation. The hierarchical calculation unit 206 has a configuration as illustrated in FIG. 4. A basic operation of the hardware configuration illustrated in FIG. 4 will be described. In the description, there is a sample of a process in which feature planes 305a and 305b illustrated in FIG. 3 are generated and then a feature plane 307 illustrated in FIG. 3 is generated.

The feature plane 305a is calculated by performing convolution calculation on the three feature planes 303a to 303c of the first hierarchical layer 308, which is the previous hierarchical layer. A convolution calculation unit 401 performs convolution calculation on the feature plane 303a using a kernel 3041a, which is schematically illustrated in FIG. 4, and transmits data on the calculation result to a cumulative adder 402. Similarly, the convolution calculation unit 401 performs convolution calculation on the feature plane 303b using a kernel 3042a, and transmits data on the calculation result to the cumulative adder 402. Further, the convolution calculation unit 401 performs convolution calculation on the feature plane 303c using a kernel 3043a, and transmits data on the calculation result to the cumulative adder 402. The convolution calculation unit 401 may process the three types of kernels sequentially or simultaneously.

The cumulative adder 402 cumulatively adds the data on the convolution calculation results transmitted from the convolution calculation unit 401, and outputs data on the cumulative addition result to a non-linear conversion unit 403.

The non-linear conversion unit 403 performs non-linear conversion processing on the data on the cumulative addition result output from the cumulative adder 402 using a rectified linear unit (ReLU) function or logistic function. The above-described processing is performed while the entire feature plane is scanned pixel by pixel, whereby the feature plane 305a is calculated.

Similarly, the feature plane 305b is calculated by performing three convolution calculations specified by kernels 3041b, 3042b, and 3043b, on the three feature planes 303a, 303b, and 303c, respectively, included in the first hierarchical layer 308, which is the previous hierarchical layer, cumulatively adding the results of the three convolution calculations, and then performing non-linear conversion processing. The feature plane 307 is calculated by performing convolution calculation specified by a kernel 3061 on the feature plane 305a of a previous hierarchical layer 309 and convolution calculation specified by a kernel 3062 on the feature plane 305b of the previous hierarchical layer 309, cumulatively adding the results of the two convolution calculations, and then performing non-linear conversion processing.

Each convolution calculation coefficient is predetermined by learning using a general method, such as backpropagation learning.

In the above-described convolution calculation in the CNN calculation, kernels of various sizes are used. For example, in the CNN discussed in Kaiming He, Xiangyu Zhang, Shaoqing Ren, and Jian Sun, "Deep Residual Learning for Image Recognition", CVPR2016, which is described above, kernels of 1×1, 3×3, and 7×7 sizes are used. When the CNN is implemented to hardware, it is desirable to efficiently store these various sizes of kernels on a memory. The image processing apparatus according to the present exemplary embodiment efficiently stores such various sizes of kernels on a memory using a kernel storage method described below.

Figure 5:
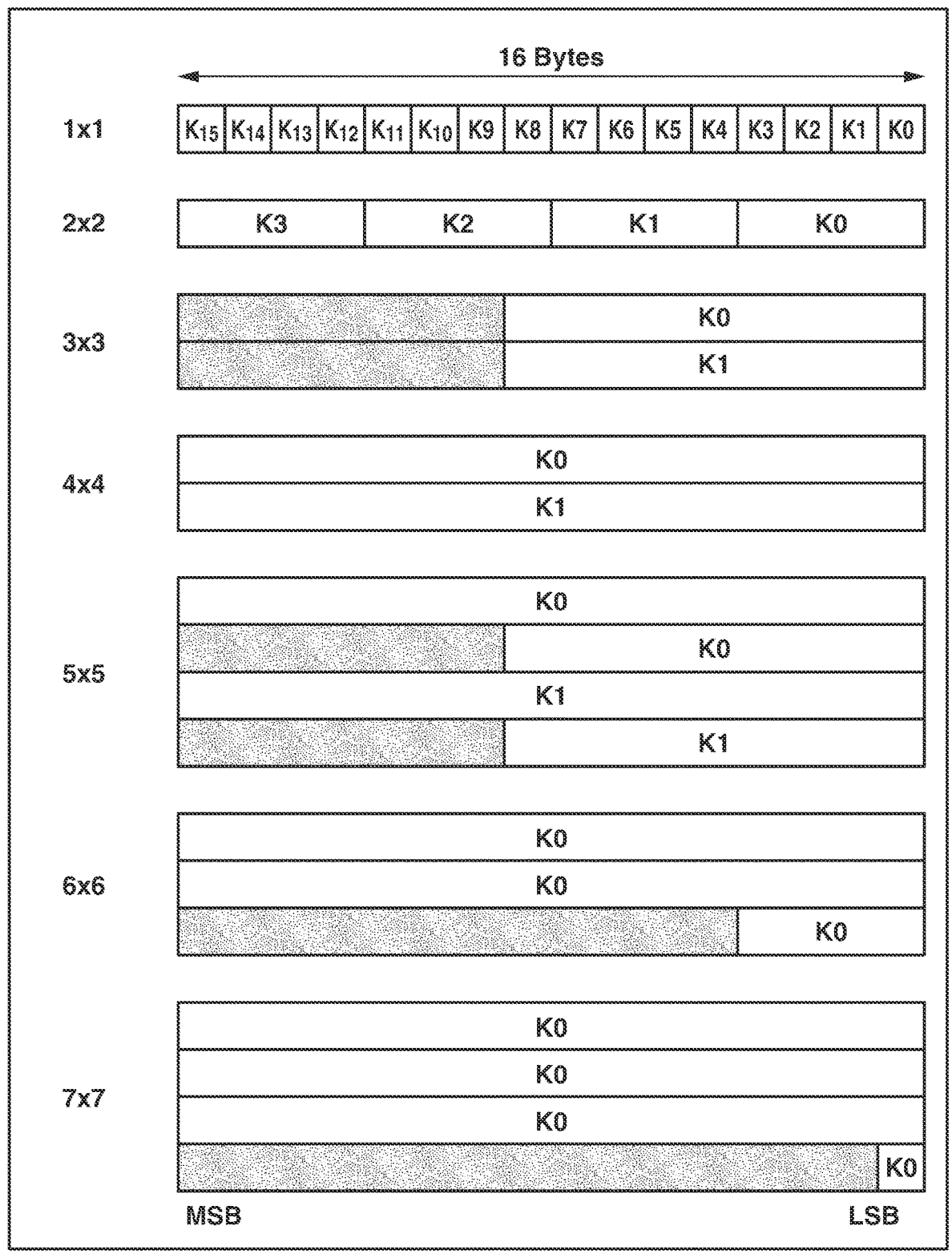
FIG. 5 illustrates an example of a known kernel storage method.
Figure 6:
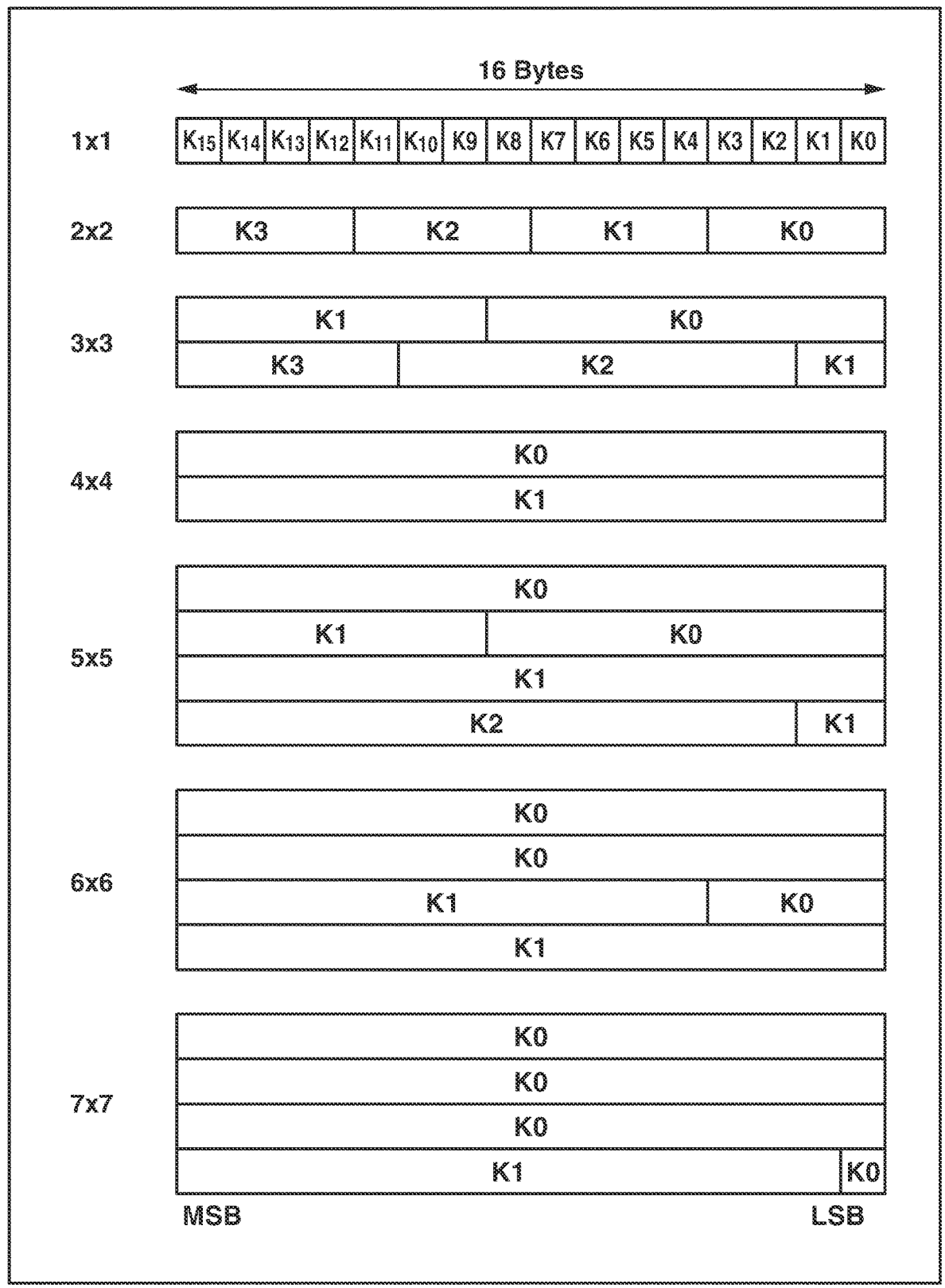
FIG. 6 illustrates another example of a known kernel storage method.

FIGS. 5 and 6 each illustrate a known kernel storage method as a comparative example with respect to the below-described kernel storage method according to the present exemplary embodiment. FIGS. 5 and 6 illustrate an example of a case where the data width of a memory is 16 bytes and the sizes of kernels are 1×1 to 7×7. Each kernel element has 1 byte. Thus, for example, a kernel of 3×3 size has 9 bytes, and a kernel of 5×5 size has 25 bytes. The kernels are successively stored from a starting address of the memory and are given sequential indexes starting with 0 in order of storage on the memory. In FIGS. 5 and 6, K0 to K3 respectively represent the kernels with indexes 0 to 3.

In the kernel storage method illustrated in FIG. 5, kernels having sizes less or equal to the data width of the memory (e.g., 1×1 to 4×4 size kernels) are collectively arranged in one address, in which a number of kernels can be contained. In this case, one kernel is arranged only in one address area. On the other hand, a kernel having a size greater than the data width of the memory (e.g., 5×5 to 7×7 sizes), only a kernel with one index is arranged in one address. The kernel storage method illustrated in FIG. 5 has an advantage in that the circuit configuration is simple and processing cost is reduced easily because of the simple arrangement patterns. However, the use rate of the memory is low.

The kernel storage method illustrated in FIG. 6 is an example of a method in which kernels having different indexes are successively arranged. The kernel storage method illustrated in FIG. 6 has an advantage in that the use rate of the memory is high because the kernels are arranged without space. However, a reading method of the kernels becomes complicated because the kernels of different indexes are successively arranged. In other words, even kernels in a same size are read by different reading methods depending on the indexes of the kernels, and thus a number of reading method patterns increase, and the circuit configuration for reading the kernels becomes complicated. Accordingly, manufacturing cost increases, and reading time of one kernel becomes long. For example, while in the method illustrated in FIG. 5, all the kernels of 3×3 size can be read by one access, some kernels (e.g., K1 and K3) of 3×3 size need twice to be accessed and read in the method illustrated in FIG. 6.

On the contrary, the kernel storage method according to the present exemplary embodiment uses a plurality of memory areas, and changes the kernel storage method as needed based on the kernel size and the memory configuration. Thus, with the kernel storage method according to the present exemplary embodiment, kernels of various sizes are efficiently stored on the memory and are read at high speed by a simple reading method.

Determination of Kernel Storage Method and Memory Configuration According to Present Exemplary Embodiment FIG. 7 is a flowchart illustrating a process by which the CPU 104 illustrated in FIG. 1 determines a kernel storage method and a memory configuration of the CNN processing unit 107 illustrated in FIG. 2.

In the kernel storage method according to the present exemplary embodiment, kernels are stored using a plurality of memories so that a large number of kernels can be stored, and the kernels can be read simply and at high speed. Further, in the kernel storage method according to the present exemplary embodiment, the memory configuration is determined based on the type of the size of a storage target kernel. Hereinafter, Floor( ) is a floor function, and Ceil( ) is a ceiling function. Each element of the kernels will be referred to as "weight coefficient". For example, the kernel of 3×3 size consists of nine weight coefficients. The sizes of the weight coefficients, memory capacities, and data widths are in units of bytes.

The CPU 104 controls each component of the CNN processing unit 107 illustrated in FIG. 2 by changing the setting values of the register unit 208. Specifically, the CPU 104 changes the setting values of the register unit 208 to control memory access with the DMAC 202, writing with the writing unit 207, reading with the reading unit 205g, and calculation with the hierarchical calculation unit 206. To simplify the description, description of the control of each component by the CPU 104 via the register unit 208 will be omitted as needed.

In step S701, the CPU 104 determines a memory capacity M1 and a data width W1 of the first storage unit 203. The memory capacity M1 is determined based on the total data size of kernels for CNN processing on one hierarchical layer. In the present exemplary embodiment, the data width W1 is set to a desirable value.

In step S702, the CPU 104 determines a division ratio (hereinafter, referred to as "ratio of weight coefficients") by which the weight coefficients of a storage target kernel of a size are divided to distribute the divided weight coefficients between the first storage unit 203 and the second storage unit 204 and store the distributed weight coefficients on the first storage unit 203 and the second storage unit 204. For example, the ratio of weight coefficients is determined based on the relationship between the data width W1 and the number of weight coefficients N as described below, where N is the number of weight coefficients contained in one kernel. The number of weight coefficients N corresponds to a value that specifies the number of bytes of the N weight coefficients, and the number of weight coefficients contained in one kernel is a value that specifies the number of bytes of the kernel.

Figure 8A:
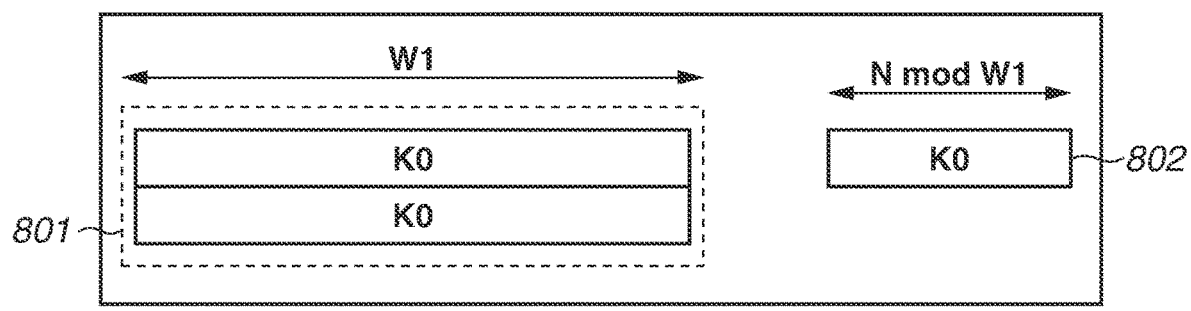
FIGS. 8A and 8B each illustrate a kernel dividing method.

FIG. 8A illustrates a method of storing a kernel on the first storage unit 203 and the second storage unit 204 in a case where the relationship between the data width W1 of the memory and the number of weight coefficients N of one kernel is W1≤N. In FIG. 8A, a weight coefficient 801 is a weight coefficient that is to be stored on the first storage unit 203, and a weight coefficient 802 is a weight coefficient that is to be stored on the second storage unit 204. In a case where W1≤N, the writing unit 207 successively stores the weight coefficients contained in one kernel on the first storage unit 203. When the number of remaining weight coefficients that are not stored becomes less than the data width of the first storage unit 203, the remaining weight coefficients are stored on the second storage unit 204. For example, N1 and N2 are calculated using formula (2):

$$N1 = N - (N \bmod W1), \text{ and}$$

$$N2 = N \bmod W1 \tag{2},$$

where N1 is a number of weight coefficients of one kernel that are stored on the first storage unit 203, and N2 (N1+N2=N) is a number of weight coefficients of the kernel that are stored on the second storage unit 204.

Figure 8B:
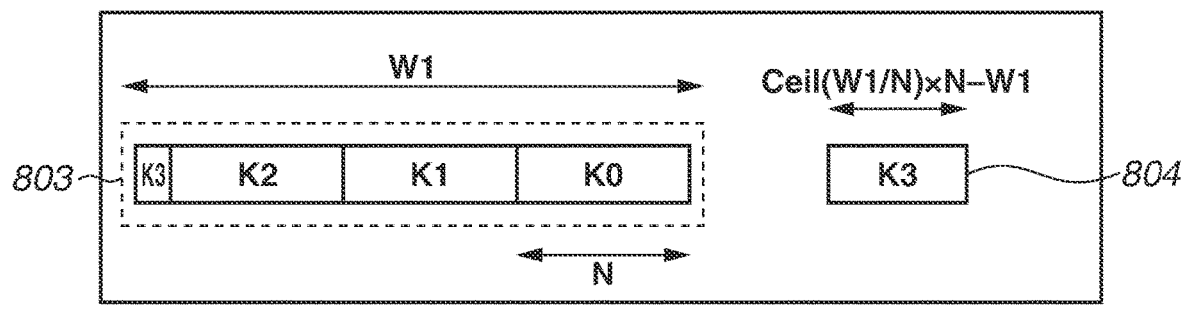

FIG. 8B illustrates a method of storing kernels on the first storage unit 203 and the second storage unit 204 in a case where the relationship between the data width W1 and the number of weight coefficients N of one kernel is W1>N. In FIG. 8B, a weight coefficient 803 is a weight coefficient that is to be stored on the first storage unit 203, and a weight coefficient 804 is a weight coefficient that is to be stored on the second storage unit 204. In a case where W1>N, the writing unit 207 successively stores Ceil(W1/N) pieces of kernels on one address area of the first storage unit 203 and stores some of the kernels that cannot be stored on the first storage unit 203 on the second storage unit 204. For example, NP1 and NP2 are calculated using formula (3):

$$NP1 = W1, \text{ and}$$

$$NP2 = \text{Ceil}(W1/N) \times N - W1 \tag{3},$$

where NP1 is a number of weight coefficients of the Ceil(W1/N) pieces of kernels that are stored on the first storage unit 203, and NP2 (NP1+NP2=N×Ceil(W1/N)) is a number of weight coefficients of the Ceil(W1/N) pieces of kernels that are stored on the second storage unit 204.

When calculating a ratio between a number of weight coefficients that are stored on the first storage unit 203 and a number of weight coefficients that are stored on the second storage unit 204 using formulas (2) and (3), the ratio may vary significantly depending on the kernel size. For example, when the memory capacity of the second storage unit 204 is denoted by M2, the use rate of the first storage unit 203 and the second storage unit 204 is maximized when N1:N2=M1:M2 or NP1:NP2=M1:M2. Accordingly, in order to realize a high use rate of the memories for every kernel size, the ratio between N1 and N2 or the ratio between NP1 and NP2 for every kernel size is desirably close to M1:M2. For this purpose, the CPU 104 optimizes the ratio in step S703 in FIG. 7, i.e., the CPU 104 performs adjustment to optimize the ratio of the number of weight coefficients.

In step S703, the CPU 104 sets an optimization target ratio NG1:NG2 of the number of weight coefficients. The CPU

104 then sets the values of N1 and N2 or the values of NP1 and NP2 such that N1:N2 or NP1:NP2 for each kernel becomes close to NG1:NG2.

For example, in a case where the relationship between the data width W1 and the number of weight coefficients N is W1≤N, numbers of weight coefficients N1' and N2' are calculated using formula (4):

$$N1'=N1+E\times D, \text{ and}$$

$$N2'=N2-E\times D \qquad (4),$$

where N1' is a changed value of N1, N2' is a changed value of N2, and E is calculated using formula (4a):

$$E = \begin{cases} 1 & \text{if } N1/N2 \le NG1/NG2 \\ -1 & \text{otherwise} \end{cases} \qquad (4a)$$

Figure 9A:
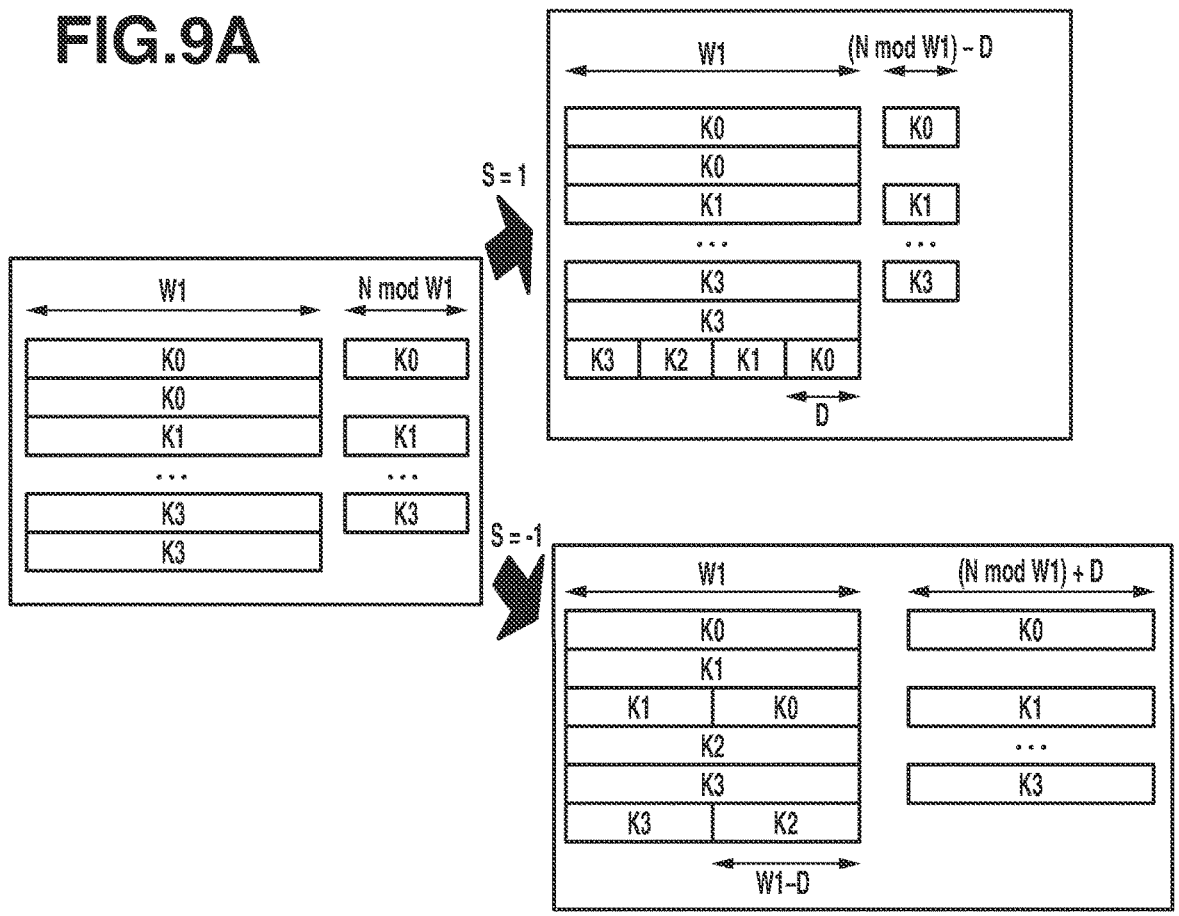
FIGS. 9A and 9B each illustrate a method of optimizing kernel storage on an internal memory.

FIG. 9A illustrates a method of determining the value of D in formula (4). In a case where E in formula (4) is E=1, the CPU 104 selects a value of D that satisfies (W1 mod D)=0 so that data obtained by connecting D pieces of weight coefficients of each of a plurality of kernels that are added to the first storage unit 203 fits in one address. In a case where E=−1, the CPU 104 selects a value of D that satisfies (W1 mod (W1−D))=0 so that data obtained by connecting the remaining weight coefficients of each of a plurality of kernels after the D pieces of weight coefficients are subtracted from the first storage unit 203 fits in one address. By selecting the value of D that satisfies the above-described conditions, the CPU 104 adjusts the values of N1 and N2 without decreasing the use rate of the first storage unit 203.

Further, for example, in a case where the relationship between the data width W1 and the number of weight coefficients N is W1>N, numbers of weight coefficients NP1' and NP2' are calculated using formula (5):

$$NP1'=NP1+EP\times DP, \text{ and}$$

$$NP2'=NP2-EP\times DP \qquad (5),$$

where NP1' is a changed value of NP1, NP2' is a changed value of NP2, and EP is calculated using formula (5a):

$$EP = \begin{cases} 1 & \text{if } NP1/NP2 \le NG1/NG2 \\ -1 & \text{otherwise} \end{cases} \qquad (5a)$$

Figure 9B:
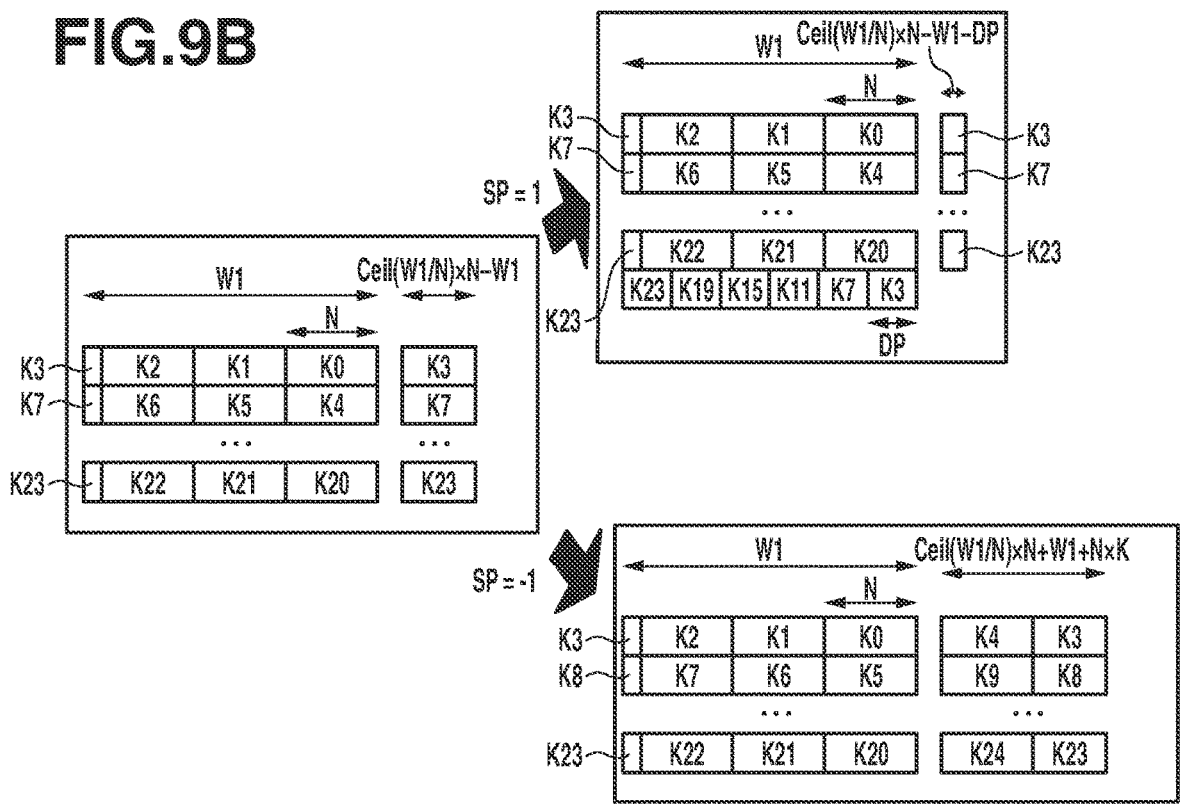

FIG. 9B illustrates a method of determining the value of DP in formula (5). In a case where EP in formula (5) is EP=1, the CPU 104 selects a value of DP that satisfies (W1 mod DP)=0 so that data obtained by connecting DP pieces of weight coefficients of each of a plurality of kernels that are added to the first storage unit 203 fits in one address. In a case where EP=−1, the CPU 104 moves J pieces of kernels per address of the first storage unit 203 to the second storage unit 204. Thus, DP=N×J. By selecting a value of DP that satisfies the above-described conditions, the CPU 104 adjusts the values of NP1 and NP2 without decreasing the use rate of the first storage unit 203.

In step S704 in FIG. 7, the CPU 104 determines a kernel storage method in storing kernels on the first storage unit 203 and the second storage unit 204.

For example, in a case where N2'>0 or NP2'>0, the CPU 104 determines a kernel storage method in which kernels are stored on the first storage unit 203 and the second storage unit 204 at the ratio determined in step S703.

For example, in a case where N2'=0 or NP2'=0, the CPU 104 determines a kernel storage method in which kernels are stored on the first storage unit 203 and thereafter kernels are stored on the second storage unit 204. In this case, the kernels are stored on the second storage unit 204 according to the kernel storage method illustrated in FIG. 5.

In step S705, the CPU 104 determines a memory capacity M2 and a data width W2 of the second storage unit 204. The data width W2 is set to the least common multiple of N2' and NP2' for all the kernel sizes×P (P is an integer of 1 or greater) in order to arrange the kernels of any size in the data width W2 without space. Since the number of cycles of reading a kernel with N2'=0 or NP2'=0 from the second storage unit 204 varies depending on the data width W2, the CPU 104 determines the value of P such that the number of cycles for reading one kernel satisfies a required reading speed. For example, the memory capacity M2 is determined using formula (6):

$$M2=\text{Floor}(M1\times NG2/NG1/W2)/W2 \qquad (6).$$

Figure 10:
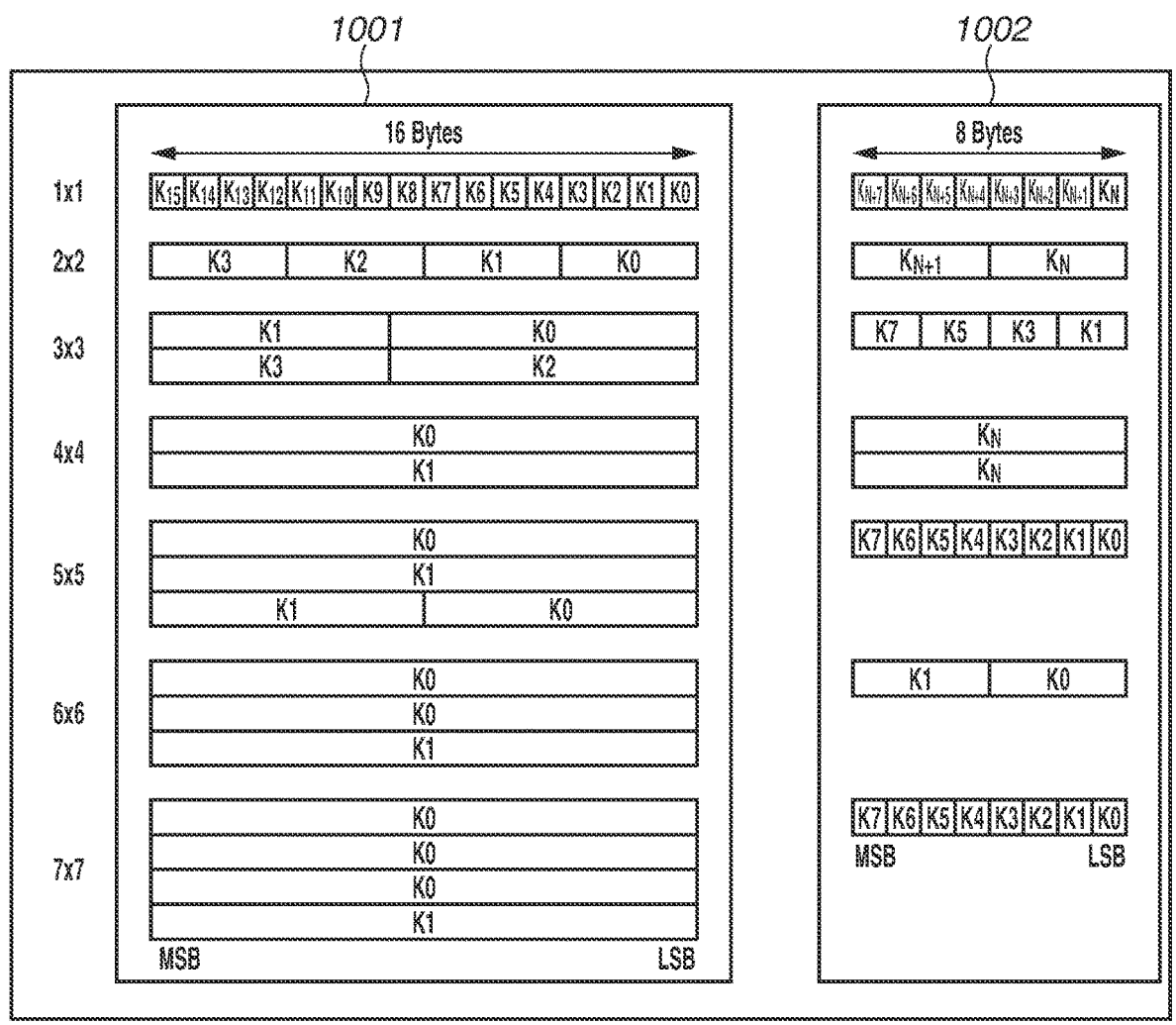
FIG. 10 illustrates an example of a method of storing a kernel on an internal memory according to a first exemplary embodiment.

FIG. 10 illustrates an example of a case where kernels having 1×1 to 7×7 sizes are stored by the kernel storage method according to the present exemplary embodiment.

A storage method 1001 indicates a method of storing kernels on the first storage unit 203, and a storage method 1002 indicates a method of storing kernels on the second storage unit 204.

A process of determining a kernel storage method in FIG. 10 will be described with reference to the flowchart illustrated in FIG. 7.

In step S701, the CPU 104 determines values of the data width W1 and the memory capacity M1 as described above. In the example illustrated in FIG. 10, the data width W1 is set to W1=16, and the memory capacity M1 is set to M1=1024.

In step S702, the CPU 104 provisionally determines the numbers of weight coefficients N1 and N2 or the numbers of weight coefficients NP1 and NP2 for the sizes of 1×1 to 7×7. According to formulas (2) and (3) described above, for example, in a case where the size is 1×1, (NP1, NP2)=(16, 0). Further, for example, in a case where the size is 2×2, (NP1, NP2)=(16, 0). In a case where the size is 3×3, (NP1, NP2)=(16, 2). In a case where the size is 4×4, (N1, N2)=(16, 0). Similarly, in a case where the size is 5×5, (N1, N2)=(16, 9). In a case where the size is 6-6, (N1, N2)=(32, 4). In a case where the size is 7×7, (N1, N2)=(48, 1).

In step S703, the CPU 104 performs optimization such that the ratio between N1 and N2 or the ratio between NP1 and NP2 for all the kernels becomes close to NG1:NG2. In the present exemplary embodiment, NG1:NG2=8:1. Since the kernels of I×1 and 2×2 sizes have a low use rate of the memory when a value other than DP=0 is set, DP is set to DP=0. For the kernel having 3×3 size, NP1:NP2=8:1, and thus no change is needed. For the kernels having 4×4 and 7×7 sizes have a low use rate of the memory when a value other than D=0 is set, D is set to D=0. For the kernel having 6×6 size, N1:N2=8:1, and thus no change is needed. For the kernel having 5×5 size, D is set to D=8 so that (N1', N2')=(24, 1).

In step S704, the CPU 104 sets the least common multiple of N2' and NP2' of all the kernels×P to W2. For 3×3 size, NP2'=2. For 5×5 size, N2=1. For 6×6 size, N2'=4. For 7×7 size, N2'=1. Thus, the least common multiple of N2' and NP2' of all the kernels is 4. If P is set to P=2 to read the kernel of 4×4 size for which N2'=0 from the second storage unit 204 in two cycles, W2=8. M2 is set to M2=128 according to formula (6).

Figure 11:
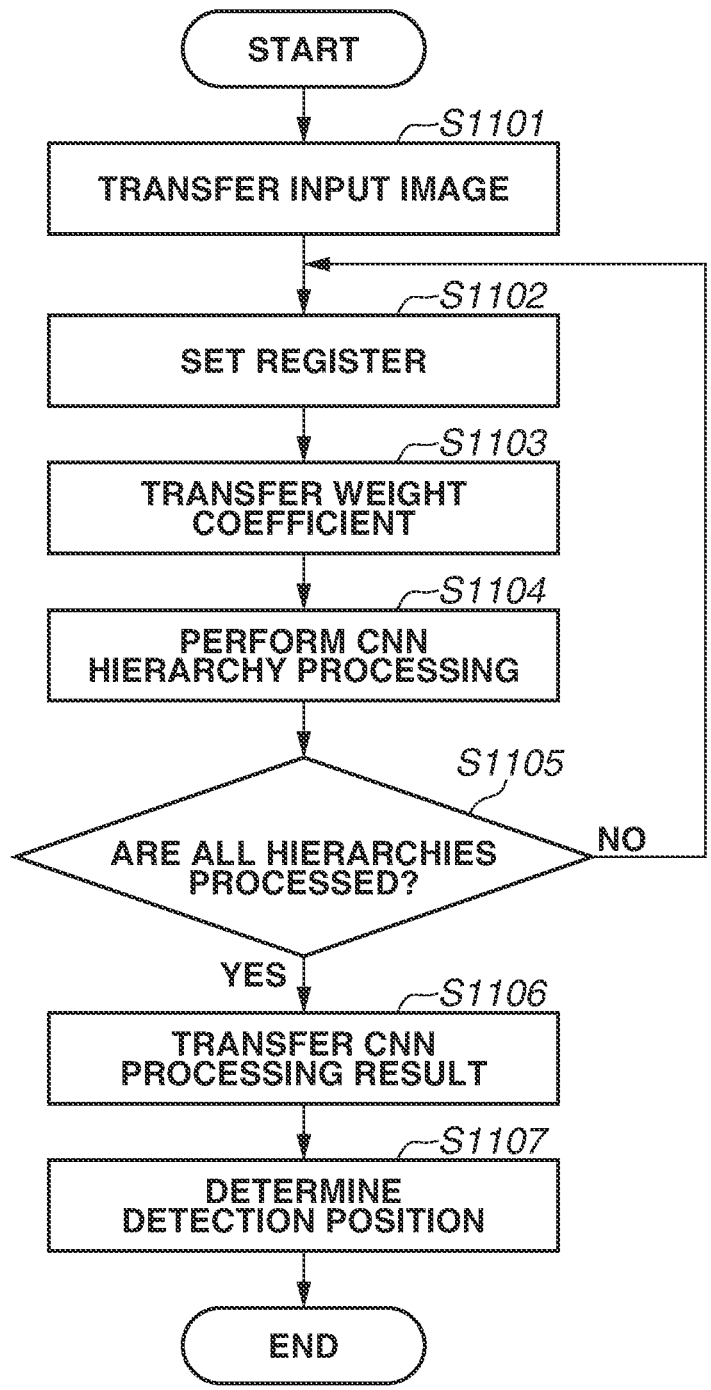
FIG. 11 is a flowchart illustrating a process of pattern recognition processing according to the first exemplary embodiment.

FIG. 11 is a flowchart illustrating operations of the image processing apparatus illustrated in FIG. 1. A case will be described below where, for example, detection of a human head portion is performed as pattern recognition processing on a detection target object in an image. In CNN calculation, for example, the kernels having the sizes of 3×3 and 5×5 are used. The first storage unit 203 and the second storage unit 204 have the memory configuration illustrated in FIG. 10.

In step S1101, the DMAC 202 reads pre-processed image data stored on the RAM 106 and stores the read image data on the image storage unit 201.

In step S1102, the CPU 104 sets register values for generating feature planes of one hierarchical layer from the image data to the register unit 208. The setting values are used for processing one CNN hierarchical layer including an image size, kernel size, and network connection related value.

In step S1103, the DMAC 202 reads the kernels from the RAM 106 and transmits the read kernels to the writing unit 207. The writing unit 207 stores the kernels received from the DMAC 202 on the first storage unit 203 and the second storage unit 204.

Figure 12:
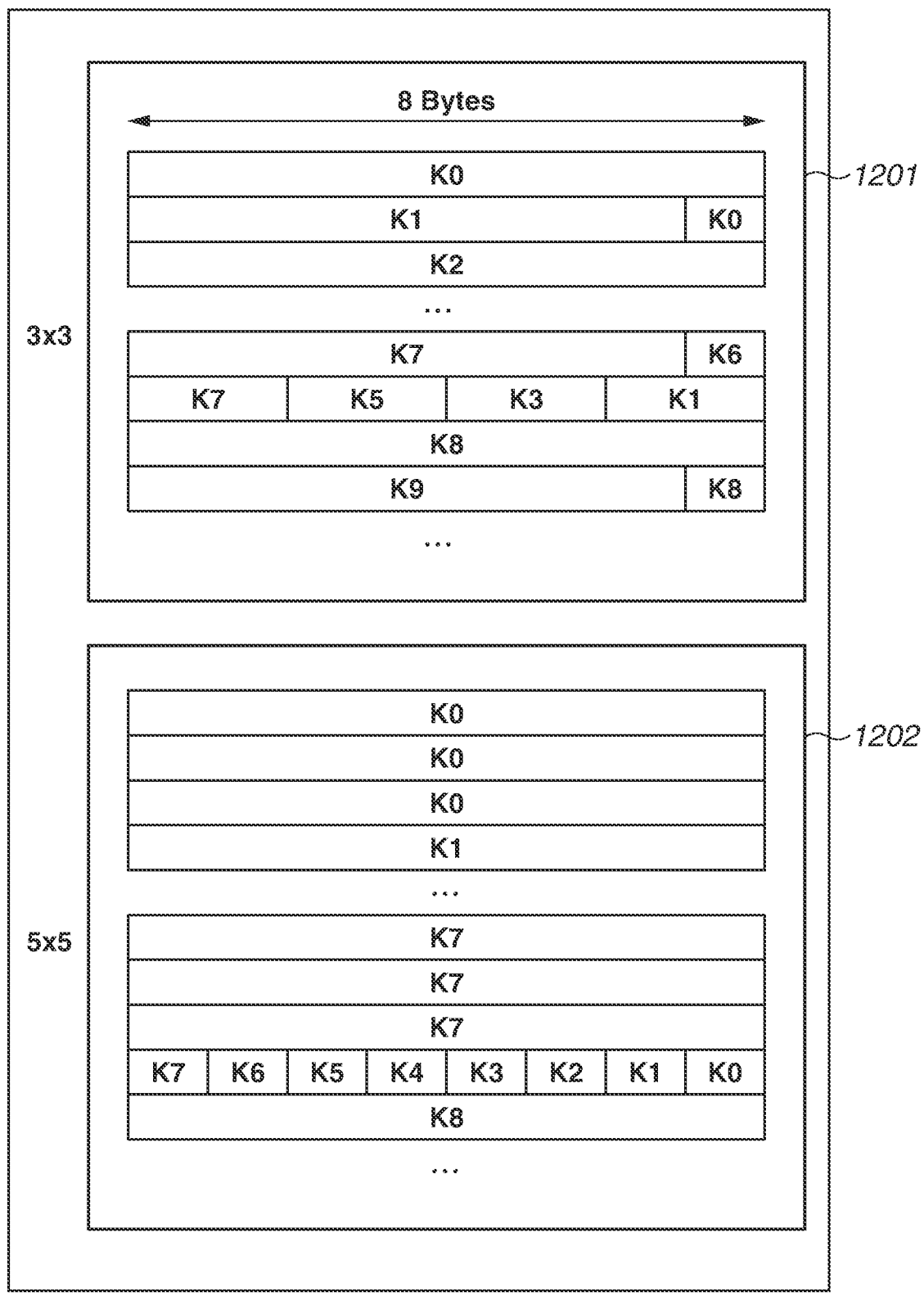
FIG. 12 illustrates an example of a method of storing a kernel on an external memory according to the first exemplary embodiment.

FIG. 12 illustrates a kernel storage method in storing the kernel having 3×3 or 5×5 size on the first storage unit 203 and the second storage unit 204 included in the RAM 106.

As described above, the CPU 104 determines a kernel storage method that realizes easy storage of kernels of different sizes. The writing unit 207 arranges kernels in the first storage unit 203 and the second storage unit 204 in the RAM 106 according to the determined kernel storage method. As illustrated in FIG. 12, the writing unit 207 stores 8-byte input data that is sequentially input from the DMAC 202 on the first storage unit 203 and the second storage unit 204.

For a kernel 1201 having 3×3 size, the writing unit 207 determines 9 pieces of input data as one cycle and stores a first to eighth input data and a ninth input data on the first storage unit 203 and the second storage unit 204, respectively. Further, for a kernel 1202 having 5×5 size, the writing unit 207 determines 25 pieces of input data as one cycle and stores a first to a 24th input data and a 25th input data on the first storage unit 203 and the second storage unit 204, respectively. While only the examples of 3×3 and 5×5 sizes are described in the present exemplary embodiment, the writing unit 207 similarly arranges kernels of other sizes in the RAM 106 based on the kernel storage method and the memory configurations of the first storage unit 203 and the second storage unit 204. The writing unit 207 stores the kernels received from the DMAC 202 on the first storage unit 203 and the second storage unit 204 in a predetermined cycle using the above-described kernel storage method.

In step S1104 in FIG. 11, the reading unit 205 reads kernels from the first storage unit 203 and the second storage unit 204 and transmits the read kernels to the hierarchical calculation unit 206. The hierarchical calculation unit 206 executes convolution calculation and non-linear processing using the image data read from the image storage unit 201 and the kernels received from the reading unit 205, and generates feature planes of one hierarchical layer. The hierarchical calculation unit 206 then stores the generated feature planes on the image storage unit 201.

Details of operations of the reading unit 205 will be described below, and kernels having the sizes of 3×3 and 5×5 will be described as an example. In the following description, i is an integer of 0 or greater.

First, a method of reading a kernel having 3×3 size will be described. For example, in a case of reading a (2×i)th kernel, the reading unit 205 reads data from an area of an address i in the first storage unit 203, extracts the data of 9 less-significant bytes, and generates a kernel. In a case of reading the (2×i+1)th kernel, the reading unit 205 reads data of 7 more-significant bytes from the area of the address i from the first storage unit 203. The reading unit 205 reads data of 2 bytes from the (i mod 2)th byte of data of address Floor(i/2) from the second storage unit 204. Then, the reading unit 205 connects the data together to generate a kernel.

Next, a method of reading a kernel having the 5×5 size will be described. In the present embodiment, for example, a case of reading the ith kernel having 5×5 size will be described. The reading unit 205 reads data of an address Floor(i/2)×3 and data of 8 bytes from an {(i mod 2)×8}th byte of the address Floor(i/2)×3+2−(i mod 2) from the first storage unit 203. The reading unit 205 reads data of an (i mod 4)th byte of an address Floor(i/4) from the second storage unit 204. Then, the reading unit 205 connects the data together to generate a kernel.

Figure 13:
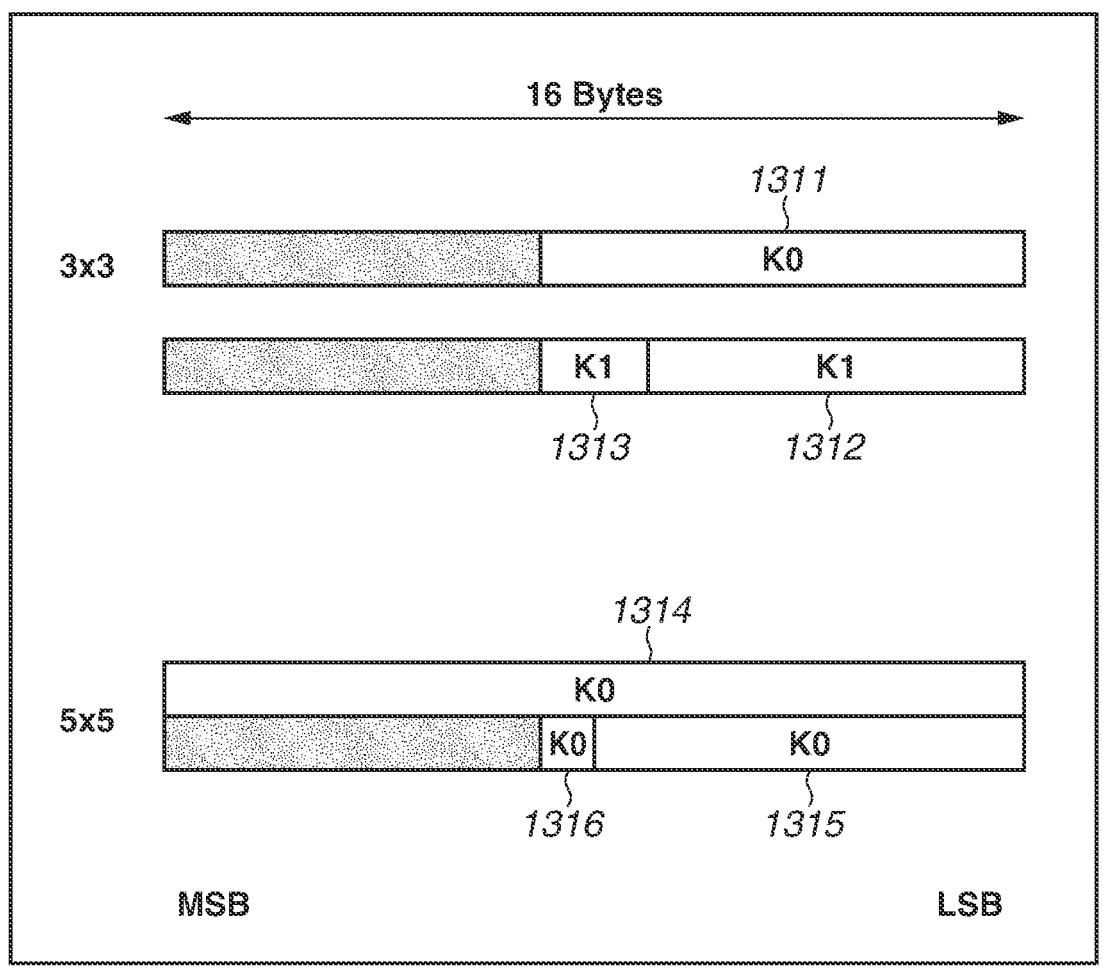
FIG. 13 illustrates an example of an output data format of a reading unit.

FIG. 13 illustrates an example of a data format of data that is output from the reading unit 205. The reading unit 205 sequentially stores the kernels read by the above-described method to thereby form output data in the format as illustrated in FIG. 13. In a case where the size of one piece of output data is 16 bytes, the reading unit 205 fills a high-order position with dummy data by padding and generates output data if the kernel size is not a multiple of 16 bytes. For example, in a case where the size is 3×3, data 1311, data 1312, and data 1313 are real data, whereas the rest is dummy data. Similarly, in a case where the size is 5×5, data 1314, data 1315, and data 1316 are real data, whereas the rest is dummy data.

Back to FIG. 11, in next step S1105, the CPU 104 determines whether all the hierarchical layers have been processed by the hierarchical calculation unit 206. In a case where the CPU 104 determines that all the hierarchical layers have been processed (YES in step S1105), the processing proceeds to step S1106. In a case where the CPU 104 determines that there remains an unprocessed hierarchical layer (NO in step S1105), the processing returns to step S1102, and the next hierarchical layer is processed in steps S1102 to S1104. In the case of the example of CNN calculation described above with reference to FIG. 3, the loop of steps S1102 to S1104 is repeated three times to thereby generate a final feature plane 307.

In step S1106, the DMAC 202 transfers the final feature plane from the image storage unit 201 to the RAM 106.

Figure 14A:
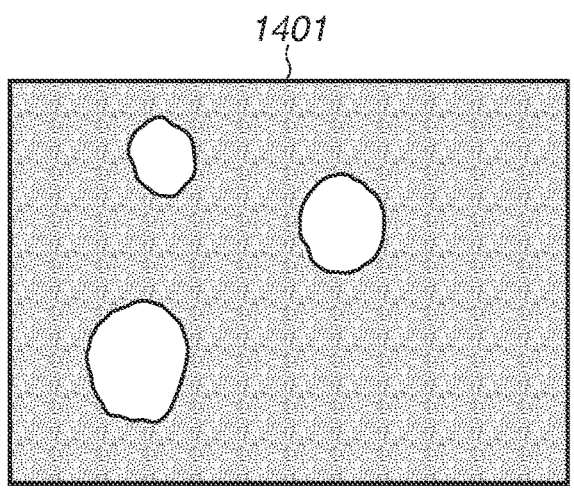
FIGS. 14A and 14B illustrate an example of a result of pattern recognition processing.
Figure 14B:
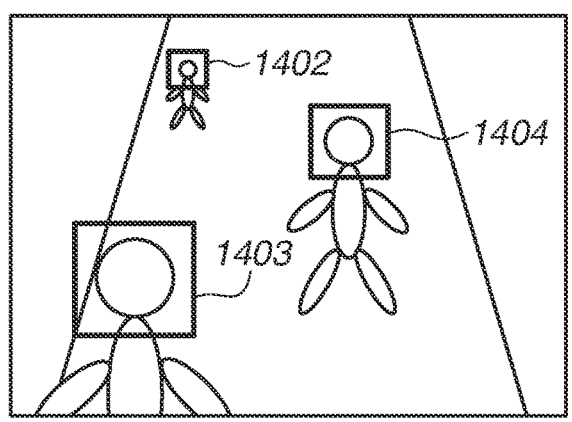

In step S1107, the CPU 104 determines a detection position of a human head portion as an example of a detection target object from a feature plane stored on the RAM 106. FIGS. 14A and 14B schematically illustrate a result of pattern recognition of, for example, a human head portion. Each pixel value of a feature plane 1401 illustrated in FIG. 14A is a value that indicates the possibility that the pixel is a pixel in an area of a human head portion. The CPU 104 extracts information such as the position and size of the human head portion from the feature plane 1401. The CPU 104 then generates object detection frames 1402 to 1404 as illustrated in FIG. 14B based on the extracted information, and displays the input image with the object detection frames 1402 to 1404 superimposed on the displayed input image on the display unit 103.

As described above, the image processing apparatus according to the present exemplary embodiment uses a plurality of memory areas, such as the first storage unit 203 and the second storage unit 204, and changes the kernel storage method based on the kernel size, the data width of each memory area, and the number of words. In this way, the image processing apparatus according to the present exemplary embodiment realizes more efficient storage of kernels of various sizes on a memory compared to the kernel storage method illustrated in FIG. 5.

On the other hand, with the kernel storage method according to the present exemplary embodiment that is illustrated in FIG. 10, the number of kernels that can be stored on a memory with a memory capacity of M1+M2=1152 bytes is, for example, 1152 for a kernel having 1×1 size, 288 for a kernel having 2×2 size, 128 for a kernel having 3×3 size, 72 for a kernel having 4×4 size, 42 for a kernel having 5×5 size, 32 for a kernel having 6×6 size, or 21 for a kernel having 7×7 size. Specifically, for example, for the kernels having 3×3, 5×5, 6×6, and 7×7 sizes, the kernel storage method according to the present exemplary embodiment can store more kernels than the storage method illustrated in FIG. 5. For the kernels having 1×1, 2×2, and 4×4 sizes, the kernel storage method according to the present exemplary embodiment can store a same number of kernels as that of the storage method illustrated in FIG. 5.

With the kernel storage method according to the present exemplary embodiment, the kernel arrangement pattern is simple, and thus the kernel reading method is simpler than that of the kernel storage method illustrated in FIG. 6. With the kernel storage method according to the present exemplary embodiment, kernels are not separately arranged in a plurality of addresses not as in the kernel storage method illustrated in FIG. 6, and thus the kernel reading processing is simple and fast. Specifically, with the kernel storage method according to the present exemplary embodiment as illustrated in FIG. 10, the number of cycles to read, for example, one kernel having 3×3 size is one, and the number of cycles to read one kernel having 5×5 size is two. With the kernel storage method illustrated in FIG. 6, two cycles may be needed to read one kernel having 3×3 size, and three cycles may be needed to read one kernel having 5×5 size.

Next, a second exemplary embodiment will be described. A configuration and a process of an image processing apparatus according to the second exemplary embodiment are similar to those used in the first exemplary embodiment, so that illustration and description thereof are omitted. Only a difference between the first and second exemplary embodiments will be described below.

In the kernel storage method according to the first exemplary embodiment, kernels are successively stored from the less-significant bytes of the first storage unit 203 regardless of the value of the data width W1 of the first storage unit 203. In contrast, if the relationship between the data width W1 and the number of weight coefficients N is W1>N, a kernel storage method according to the second exemplary embodiment changes a method of storing a kernel on the first storage unit 203 based on the value of the data width W1 as described below.

For example, in a case where W1 mod Ceil(W1/N))≠0, the CPU 104 sets the storage method as described above in the first exemplary embodiment to the CNN processing unit 107.

In a case where W1 mod Ceil(W1/N))=0, the CPU 104 sets a method that stores W1/Ceil(W/N) pieces of weight coefficients per kernel on the first storage unit 203 so that the same storage method is applied to kernels of any indexes.

Figure 15:
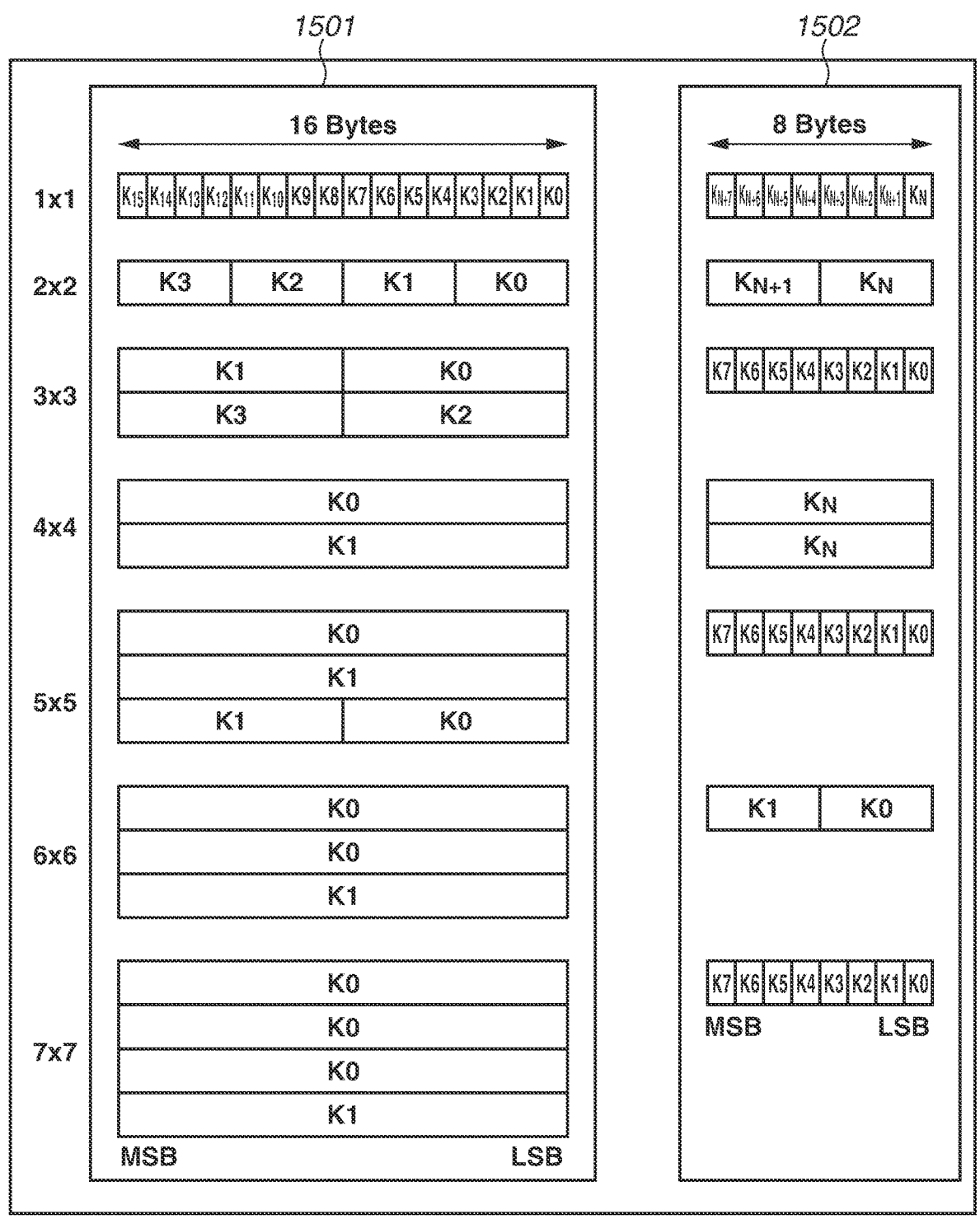
FIG. 15 illustrates an example of a method of storing a kernel on an internal memory according to a second exemplary embodiment.

FIG. 15 illustrates an example of a case where kernels having 1×1 to 7×7 sizes are stored by the kernel storage method according to the second exemplary embodiment.

A storage method 1501 indicates a method of storing kernels on the first storage unit 203, and a storage method 1502 indicates a method of storing kernels on the second storage unit 204. As apparent from FIG. 15, the method of storing the kernel having 3×3 size on the second storage unit 204 in the second exemplary embodiment is different from the storage method according to the first exemplary embodiment that is illustrated in FIG. 10.

As described above, in the second exemplary embodiment, the CPU 104 employs the same method in storing kernels of any indexes on the memory in a case where the data width of the first storage unit 203 satisfies a predetermined condition. The kernel storage method according to the second exemplary embodiment is simpler than the kernel storage method according to the first exemplary embodiment, so that the size of a circuit for reading kernels is reduced.

Next, a third exemplary embodiment will be described. A configuration of an image processing apparatus according to the third exemplary embodiment is similar to that used in the first exemplary embodiment, so that illustration and description thereof are omitted. Only a difference between the third exemplary embodiment and the first and second exemplary embodiments will be described below.

In the first and second exemplary embodiments described above, the CPU 104 predetermines the configuration of the first storage unit 203 and determines the memory configuration of the second storage unit 204 based on a storage target kernel. In contrast, in the third exemplary embodiment, the CPU 104 predetermines the configurations of the first storage unit 203 and the second storage unit 204 and determines a kernel storage method based on the fixed memory configurations. FIG. 16 is a flowchart illustrating a process of determining a kernel storage method according to the third exemplary embodiment. In the flowchart in FIG. 16, a step that is similar in details of processing to that in the flowchart in FIG. 7 is given the same reference number as that in FIG. 7, and only the steps that are different in details of processing from those in FIG. 7 will be described below.

In the flowchart in FIG. 16, the CPU 104 performs processing in step S701, and then the processing proceeds to step S1601. In step S1601, the CPU 104 determines the memory capacity M2 and the data width W2 of the second storage unit 204. The CPU 104 determines the memory capacity M2 based on the total data size of kernels used for CNN processing of one hierarchical layer together with the first storage unit 203. The CPU 104 sets a value to the data width W2.

In step S1602, the CPU 104 sets a target ratio NG1:NG2 of the number of weight coefficients to NG1:NG2=M1:M2. The rest of the optimization method is similar to that performed in step S703. Then, the processing proceeds from step S1602 to step S1603.

In step S1603, the CPU 104 determines a method of storing kernels on the first storage unit 203 and the second storage unit 204. A method of storing kernels on the first storage unit 203 is similar to that in step S704. Further, any value is set to the data width W2 of the second storage unit 204, and the set value is not always the least common multiple of N2' and NP2' of kernels of all the sizes. Thus, weight coefficients of a kernel that satisfies (W2 mod N2')≠0 or (W2 mod NP2')≠0 are stored according to the kernel storage method described above with reference to FIG. 5.

As described above, the image processing apparatus according to the third exemplary embodiment realizes efficient storage of a kernel of a new size on a memory even after a method of storing kernels on the second storage unit 204 is determined.

Other Exemplary Embodiments

The first storage unit 203 and the second storage unit 204 on which kernels are stored by the above-described kernel storage methods may be separate memories or divided into two areas in one memory area. While the two storage units (i.e., the first storage unit 203 and the second storage unit 204) are described as an example in the above-described exemplary embodiments, three or more storage units may be used, and kernels may be stored depending on the memory data widths and the memory capacities of the storage units. In a case where three or more storage units are used, these storage units may be separate memories or divided into three or more areas in one memory area.

While only the example in which the kernel shape is square is described in the above-described exemplary embodiments, aspects of the present invention are not limited to those described above and are also applicable to kernels of any shapes.

While the example in which the CNN processing unit 107 is entirely dedicated hardware is described in the above-described exemplary embodiments, aspects of the present invention are not limited to those described above, and the processing of the CNN processing unit 107 can be executed partly or entirely by, for example, a CPU.

The kernel storage methods according to aspects of the present invention are not limited to the methods described in the above-described exemplary embodiments. For example, a heuristic combinatorial search method such as evolutionary computation can be used. In this case, an evaluation function is a function that shows higher evaluation values as values of CYCLE and AREA become smaller and a value of NUMBER becomes greater, where CYCLE is a number of cycles to read one kernel, AREA is a circuit size of the reading unit 205, and NUMBER is a number of kernels that can be stored.

While a storage method is determined such that the number of kernels that can be stored increases in a case where a single type of kernels are stored on the memory in the above-described exemplary embodiments, aspects of the present invention are not limited to those described above. Alternatively, a storage method can be determined such that the number of kernels that can be stored increases in a case where kernels of a plurality of sizes are stored simultaneously.

According to each of the above-described exemplary embodiments, kernels of various sizes are efficiently stored on a memory and are read at high speed by a simple method.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-122086, filed Jun. 28, 2019, which is hereby incorporated by reference herein in its entirety.

What is claimed is:

1. An information processing apparatus comprising:
   one or more processors; and
   one or more memories coupled to the one or more processors, the one or more memories having stored thereon instructions which, when executed by the one or more processors, cause the apparatus to:
   determine a storage method of storing a kernel based on respective data widths of a plurality of memories and a size of the kernel;
   store the kernel on the plurality of memories using the determined storage method;
   read out the kernel from the plurality of memories based on the determined storage method; and
   execute calculation using input data and the read out kernel,
   wherein in the determined storage method, when the size of the kernel is not a multiple of a data width of a first memory in the plurality of memories and the data width of the first memory is not a multiple of the size of the kernel, the kernel is divided into parts and the divided parts of the kernel are stored on the first memory and at least one memory other than the first memory in the plurality of memories.

2. The information processing apparatus according to claim 1, wherein in the determined storage method, when W1<N and (N mod W1)≠0 or when W1>N and (W1 mod N)≠0, where W1 is the data width of the first memory and N is the size of the kernel, one kernel is divided into parts and the divided parts of the kernel are stored on the plurality of memories.

3. The information processing apparatus according to claim 2 claim 1,
   wherein the kernel contains a plurality of weight coefficients, and
   wherein in the determined storage method, the respective data widths of the plurality of memories are determined based on the number of weight coefficients of the kernel that is to be divided and stored on the plurality memory memories.

4. The information processing apparatus according to claim 3, wherein in the determined storage method, the data width is determined based on a least common multiple of numbers of weight coefficients included in each kernel of every size that is to be stored as the data width of the plurality of memory areas.

5. The information processing apparatus according to claim 2, wherein the kernel contains a plurality of weight coefficients, and when (W1 mod Ceil(W 1/N))=0, where Ceil( ) is a ceiling function, in the determined storage method, W1/Ceil(W1/N) pieces of the weight coefficients per kernel are stored on the memories in each of which the data width is W1.

6. The information processing apparatus according to claim 2, wherein in dividing the kernel into parts and storing the divided parts of the kernel on the plurality of memories in the determined storage method, a remaining portion of the kernel that is not stored on the first memory is stored on a second memory, the second memory area being a memory other than the first memory area.

7. The information processing apparatus according to claim 1, wherein in the determined storage method, the kernel is divided such that a division ratio in dividing the kernel into parts and storing the divided parts of the kernel on the plurality of memories is close to a predetermined ratio.

8. The information processing apparatus according to claim 7, wherein in the determined storage method, a capacity of each of the plurality of memories is determined based on the division ratio in dividing the kernel into parts and storing the divided parts of the kernel on the plurality of memories.

9. The information processing apparatus according to claim 1, wherein the calculation includes convolution calculation using the input data and the kernel.

10. The information processing apparatus according to claim 9, wherein the convolution calculation is performed in a unit of a hierarchical layer of a plurality of hierarchical layers by a neural network.

11. The information processing apparatus according to claim 1, wherein the instructions, when executed by the one or more processors, further cause the apparatus to, detect a detection target object from image data by pattern recognition based on a result of the calculation.

12. An information processing method comprising:
determining a storage method of storing a kernel based on respective data widths of a plurality of memories and a size of the kernel;
storing the kernel on the plurality of memories using the determined storage method;
reading out the kernel from the plurality of memories based on the determined storage method; and
executing calculation using input data and the read out kernel,
wherein in the determined storage method, when the size of the kernel is not a multiple of a data width of a first memory in the plurality of memories and the data width of the first memory is not a multiple of the size of the kernel, the kernel is divided into parts and the divided parts of the kernel are stored on the first memory and at least one memory other than the first memory in the plurality of memories.

13. A non-transitory computer-readable storage medium that stores a program for causing a computer to perform an information processing method comprising:
determining a storage method of storing a kernel based on respective data widths of a plurality of memories and a size of the kernel;
storing the kernel on the plurality of memories using the determined storage method;
reading out the kernel from the plurality of memories based on the determined storage method; and
executing calculation using input data and the read out kernel,
wherein in the determined storage method, when the size of the kernel is not a multiple of a data width of a first memory in the plurality of memories and the data width of the first memory is not a multiple of the size of the kernel, the kernel is divided into parts and the divided parts of the kernel are stored on the first memory and at least one memory other than the first memory in the plurality of memories.

* * * * *